(No Model.)

J. GLUCHOWSKY.
TRAP FOR THROWING BALLS.

No. 267,188. Patented Nov. 7, 1882.

Attest,
Jno. E. Wiles
Jno. S. Jones

Inventor,
Jacob Gluchowsky
by Wood & Boyd
his Attorneys &c.

UNITED STATES PATENT OFFICE.

JACOB GLUCHOWSKY, OF CINCINNATI, OHIO.

TRAP FOR THROWING BALLS.

SPECIFICATION forming part of Letters Patent No. 267,188, dated November 7, 1882.

Application filed June 27, 1882. (No model.)

*To all whom it may concern:*

Be it known that I, JACOB GLUCHOWSKY, a citizen of the United States, and a resident of the city of Cincinnati, in the county of Hamilton and State of Ohio, have invented certain new and useful Improvements in Spring-Traps for Throwing Target-Balls or other Projectiles, of which the following is a specification.

My invention relates to a spring-trap for throwing or ejecting clay pigeons, balls, or other projectiles into the air for target-shooting; and it consists in the provision of a rotatable standard or post, upon which is pivotally mounted a barrel or cylinder in which operates an impelling-plunger preferably connecting with and actuated by a spring hand-lever, which is pivotally attached at its lower end to the said standard and moves at its upper end in a slotted arm or plate attached to said cylinder, said slotted arm being provided at its rear end with a trigger device for retaining and releasing the said spring hand-lever for the throwing operation.

The principal object of my invention is to produce an improved ball-throwing trap whose ejector operates to drive a ball or clay pigeon in a direct or straight line at any desired angle of elevation, and in various directions within the moving circuit of the rotatable mounting-post.

Figure 1:
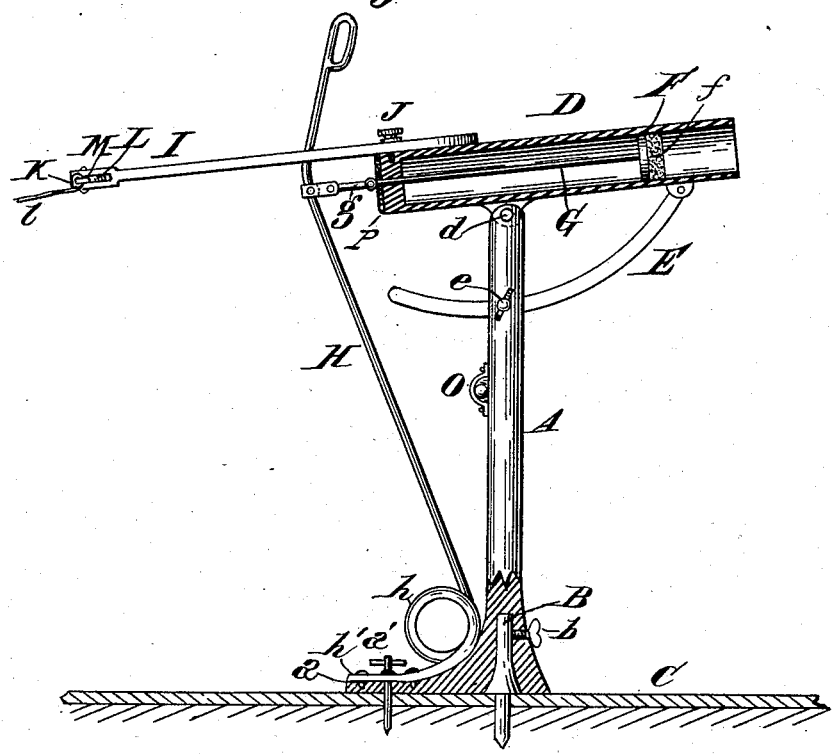
Figure 2:
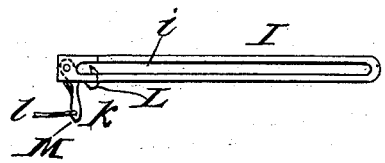

The invention is illustrated by the accompanying drawings, in which Figure 1 is an elevation of a ball-target trap embodying my improvements, showing the ejector-tube and the base of the standard in section. Fig. 2 is a plan view of the slotted trigger-arm.

A represents a rotatable standard or post, having a foot, $a$, through which passes a peg, $a'$, for securing the trap rigidly in position.

B represents a pivot, upon which the standard A rotates, it being secured in any desired position by thumb-screw $b$.

C is a platform, upon which the trap is preferably mounted.

D is a cylinder or barrel, swinging on a pivot, $d$, on the top of standard A, its angle of inclination being governed and rigidly sustained at the desired elevation by a segmental arm, E, which is pivotally connected at one of its ends to the cylinder D, its other end passing through a slot in the post A and firmly held in position by thumb-screw $e$.

F is a plunger, operating in the cylinder D. It is provided with a yielding head or face, $f$, to form a cushioned seat for the balls, and thereby obviate breaking or injuring them while in the cylinder preparatory to shooting by the marksman.

G is a plunger-rod, at one end of which is secured plunger F, the other end passing through a perforation in the closed end of cylinder D, and pivotally connected by a link, $g$, with a spring hand-lever, H, which actuates said plunger to throw the ball. Hand-lever H is coiled or wound into a spring, $h$, at its lower end, having an extension or tail, $h'$, by which it is secured to the foot $a$ of the post A. Lever H at its upper end travels in the slot $i$ of the rearwardly-projecting arm or plate I, which is preferably adjustably secured to the cylinder D by a thumb-screw, J, as shown in Fig. 1. It will be seen that the lever H in traveling in slot $i$ of the arm I will always move in a direct and true line, imparting a like effect upon the throwing-plunger and make the trap accurate and effective in its operation.

K represents a pivotal catch or trigger at the rear end of arm I. Lever H in being drawn backward rests against the hook L of the trigger, being released or discharged by a rope or cord, $l$, attached to the arm M, the trigger then returning to position for catching the hand-lever for its next operation by a spring secured to the slotted plate I, resting against the arm M.

O is a loop, secured on the post A, into which a rod or stick may be inserted to turn the trap when desired.

It is obvious that instead of forming the coiled spring on the lower end of the hand-lever H it may be a straight lever pivoted to the post A, and a spiral spring employed on the inside of the cylinder D on the plunger-rod between the plunger and the closed rear end of said cylinder. The hand-lever in being drawn backward compresses the spring and on its being released the resiliency of the spring causes the discharge.

A yielding cushion, spiral spring, or guard, P, may be secured to the end of the cylinder D, through which the plunger-rod G passes, to receive the force of the discharge action of the plunger.

A toy gun has heretofore been composed of a barrel pivoted to a base-piece and containing a plunger in the rear end of which is secured one end of a spring, the other end of the latter being secured to the base, the barrel being provided with a chamber at its breech, in which the plunger falls when retracted, and from which it is elevated and released by a trigger on the barrel. Such, however, does not constitute my invention.

I claim—

1. In a target-shooting trap, the combination of a standard or post adapted to rotate on a supporting-base, a barrel or cylinder pivoted to the standard or post and provided with an attached rearward-projecting arm carrying a trigger, a plunger arranged within the barrel or cylinder and provided with a rod or stem, and a spring hand-lever having its lower end connected with the rotatable standard or post to move with the same and connected at its upper portion with the plunger rod or stem, substantially as described.

2. In a target-shooting trap, the combination of the standard or post A, the barrel or cylinder D, pivoted thereto, the plunger F, having a rod or stem, G, the longitudinally-slotted arm I, secured to the barrel or cylinder and provided with a trigger, K, and the spring hand-lever H, having its lower end secured to the standard or post and its upper portion extending through the slotted arm and connected with the plunger rod or stem, substantially as described.

In testimony whereof I have hereunto set my hand in the presence of two subscribing witnesses.

JACOB GLUCHOWSKY.

Witnesses:
ANDREW E. SCOTT,
JNO. E. JONES.